United States Patent
Harrand et al.

(10) Patent No.: US 9,565,122 B2
(45) Date of Patent: Feb. 7, 2017

(54) STREAM MANAGEMENT IN AN ON-CHIP NETWORK

(71) Applicant: KALRAY, Orsay (FR)

(72) Inventors: Michel Harrand, Saint Egreve (FR); Yves Durand, Saint Ismier (FR); Patrice Couvert, Saint Marcellin (FR); Thomas Champseix, Grenoble (FR); Benoît Dupont De Dinechin, Grenoble (FR)

(73) Assignee: KALRAY, Orsay (FR)

( * ) Notice: Subject to any disclaimer, the term of this patent is extended or adjusted under 35 U.S.C. 154(b) by 86 days.

(21) Appl. No.: 14/353,987

(22) PCT Filed: Oct. 9, 2012

(86) PCT No.: PCT/IB2012/055445
§ 371 (c)(1),
(2) Date: Apr. 24, 2014

(87) PCT Pub. No.: WO2013/061190
PCT Pub. Date: May 2, 2013

(65) Prior Publication Data
US 2014/0301205 A1    Oct. 9, 2014

(30) Foreign Application Priority Data
Oct. 28, 2011 (FR) ...................... 11 59854

(51) Int. Cl.
*H04L 12/801* (2013.01)
*H04L 12/933* (2013.01)
(Continued)

(52) U.S. Cl.
CPC ........... *H04L 47/39* (2013.01); *G06F 13/1642* (2013.01); *G06F 15/7825* (2013.01);
(Continued)

(58) Field of Classification Search
CPC .... H04L 49/109; H04L 47/527; H04L 49/506; H04L 47/39; G06F 15/7825; G06F 13/1642
See application file for complete search history.

(56) References Cited

U.S. PATENT DOCUMENTS

| 2011/0058569 | A1 | 3/2011 | Harrand | |
| 2011/0075555 | A1* | 3/2011 | Ziegler | H04L 49/555 370/229 |
| 2012/0224482 | A1* | 9/2012 | Gramling | G06Q 30/06 370/231 |

FOREIGN PATENT DOCUMENTS

WO    WO 2006/059277 A2    6/2006

OTHER PUBLICATIONS

Seiculescu et al., "A DRAM Centric NoC Architecture and Topology Design Approach," *IEEE Computer Society Annual Symposium on VLSI*, 2011, pp. 54-59.

(Continued)

*Primary Examiner* — Donald Mills
*Assistant Examiner* — Henry Baron
(74) *Attorney, Agent, or Firm* — Oliff PLC

(57) ABSTRACT

A credit-based data flow control method between a consumer device and a producer device. The method includes the steps of decrementing a credit counter for each transmission of a sequence of data by the producer device, arresting data transmission when the credit counter reaches zero, sending a credit each time the consumer device has consumed a data sequence and incrementing the credit counter upon receipt of each credit.

16 Claims, 2 Drawing Sheets

(51) Int. Cl.
*G06F 15/78* (2006.01)
*H04L 12/931* (2013.01)
*G06F 13/16* (2006.01)
*H04L 12/873* (2013.01)

(52) U.S. Cl.
CPC .......... *H04L 47/527* (2013.01); *H04L 49/109* (2013.01); *H04L 49/506* (2013.01)

(56) References Cited

OTHER PUBLICATIONS

Dobkin, "Credit-based Communications in NoCs," *Introduction to Networks on Chips: VLSI Aspects, Technion*, Winter 2007, pp. 1-8.
International Search Report issued in International Patent Application No. PCT/IB2012/055445 mailed Jan. 31, 2013.

* cited by examiner

STREAM MANAGEMENT IN AN ON-CHIP NETWORK

FIELD

The is relates to techniques for controlling data flows in a network, especially a credit-based flow control for a network-on-chip (NoC).

BACKGROUND

Flow control techniques seek to efficiently organize the transmission of data packets between a producer device and a consumer device located on two distinct nodes of a shared asynchronous transmission channel, e.g. a network.

Within the context of a credit-based flow control, a consumer has a buffer memory or input queue for each producer, which stores packets awaiting consumption. Each producer has a credit counter that starts at the size, in number of packets, of the input queue of the consumer.

At each packet transmission, the producer decrements counter. It stops transmission when its counter reaches zero.

Transmitted packets arrive in the input queue of the consumer. The latter, after consuming as number or packets in its queue, returns to the producer a credit indicative of the available space in the queue. Upon receiving the credit, the producer increments its counter by the corresponding number, which allows, it to continue the transmission of packets.

Optimizations of technique may consist in adjusting the threshold for sending credits so that the producer receives the credits before its counter reaches zero, while their number does not congest the reverse transmission channel.

Such a flow control is used, for example, in the so-called "PCI-Express" bus.

A credit-based technique is typically used in situations where the bandwidth of the transmission channel is small compared to the processing capacity of the producers and consumers, e.g. in the context of a macroscopic network. This means that a consumer is able to empty its input queue faster than it can be filled by the transmission channel, and that the producer is able to fill an output queue in less time than it takes to empty by the transmission channel. In this situation, the packet structure has little importance because producers and consumers have sufficient resources between two packet transmissions to implement format conversions, if required.

In a network-on-chip, the network bandwidth may match the capacity of the producers and consumers. It may then be appropriate to take account of the word sizes used by the consumer and the producer, whereby a same packet may be formed of different word sizes, depending on whether it is seen by the producer or the consumer. Counting credits in numbers of packets may then be inappropriate.

SUMMARY

There is thus a need for a credit-based flow control technique that is satisfactory in a situation where the bandwidth of the transmission channel matches the capacity of producers and consumers. It is of particular interest that this control technique takes into account the different word sizes used by the producers and the consumers.

These needs may be addressed by a credit-based data flow control method between a consumer device and a producer device, comprises the steps of decrementing a credit counter for each transmission of a sequence or data by the producer device; arresting data transmission when the credit counter reaches zero; sending a credit each time the consumer device has consumed a data sequence; and incrementing the credit counter upon receipt of each credit. The size Wc of the data usable by the consumer device and the size Wp of the data transmitted by the producer device are such that Wc/Wp>1, and a credit, in number of data of size Wc, is expressed by:

$$C=(Na-Q\cdot F)/Q$$

where Na is the available space, in number of data of size Wc, in an input queue of the consumer device configured to store the data awaiting consumption, Q is a factor such that 1<Q≤Wc/Wp, and F is the number of data not yet received in the queue and corresponding to sent credits.

The consumer device may be a memory (DRAM) of Wc-bit words and the data may be transmitted over a network in packets of Wp-bits words.

The factor Q may be chosen equal to Wc/Wp when the words of the packets are stored in random locations in the memory.

The factor Q may tend to (P+1)/P, where P is the size of a burst of Wp-bit words to store in contiguous memory locations.

A credit be sent each time the consumer device has consumed a threshold number of Wc-bit words at most equal to S/Q, where S is the capacity of the queue.

The threshold number may be equal to S/Q minus the number of words that can be transmitted during the transit time of a credit.

Value F may be determined as the difference between the accumulated sent credits and the number of data received by the consumer device.

BRIEF DESCRIPTION OF DRAWINGS

Other advantages and features will become more clearly apparent from the following description of particular embodiments of the invention provided for exemplary purposes only and represented in the appended drawings, in which.

DESCRIPTION OF EMBODIMENTS

Figure 1:
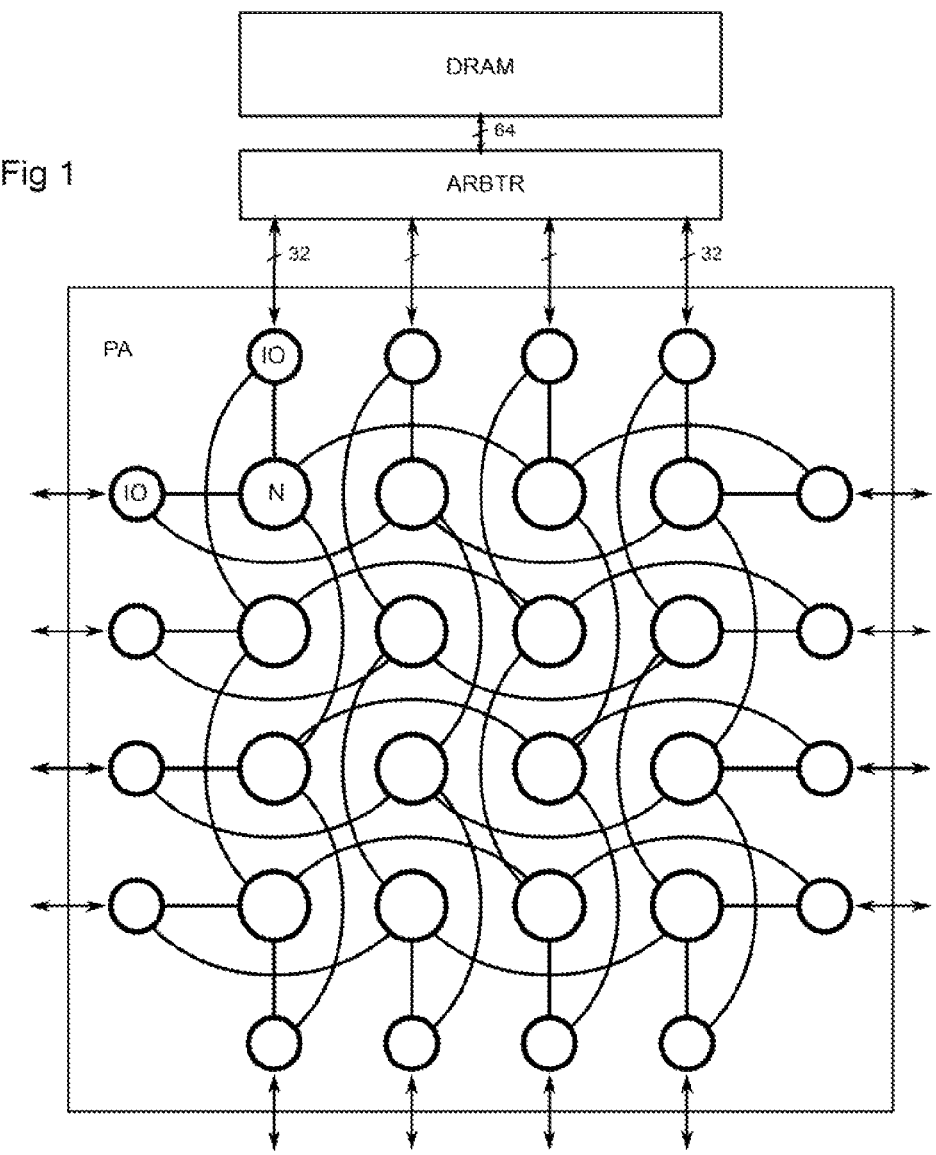
FIG. 1 schematically shows a network on chip connected to an external memory.

FIG. 1 schematically shows an array of processors PA comprising 4×4 computing nodes N arranged in a folded torus topology network-on-chip, as disclosed in U.S. patent application 2011-0058569. In an array topology, each node is connected to two other nodes in the same row and to two other nodes in the same column, by bidirectional point-to-point links. In a torus topology, the nodes of the array are moreover connected in a loop in each row and in each column, so that all nodes have the same physical structure as to their interconnections, especially the nodes at the edges of the array. In a folded topology, which is the one shown in FIG. 1, each node (except those at the edges of the array) is connected to two other nodes of same parity in the row and in the column, whereby the connections between nodes have substantially the same length.

Each node N includes a five-way router that manages the four links, designated by North, South, East and West, to the next nodes in the row and column, and a link with a computing unit, not shown, for example a cluster of processors interconnected by a parallel bus.

The processor array PA, which may be in the form of an independent integrated circuit, is generally associated with an external dynamic memory DRAM. This memory is connected to the array PA by one or more of its input/output interfaces IO, depending on the bandwidth of the interfaces and the memory. The following description essentially deals with the writing of data in the DRAM, which will be considered as the "consumer", the nodes of the array being the "producers".

In the shown example, for IO interfaces are connected to an arbitration circuit ARBTR that manages data transfers between the IO interfaces and the single memory bus. In a practical example, the memory bus has a width of 64 bits and each of the IO interfaces communicates via a 32-bit bus, having the same width as the bus used for the internal connections of the network. With this configuration, there is a theoretical balance between the memory and network bandwidths when the rate per line of the network busses is half the rate per line of the memory bus.

Thus, the memory consumes words of Wc=64 bits, while the network produces packets of words of Wp=32 bits.

Figure 2:
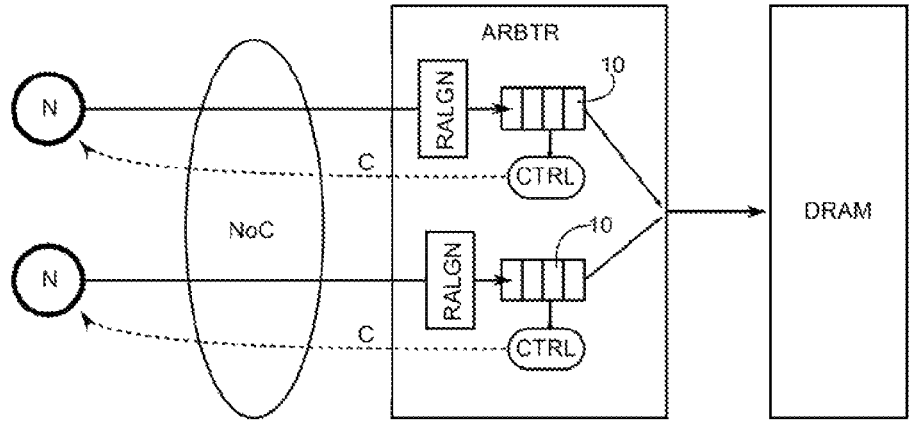
FIG. 2 shows diagrammatically and partially in the circuits involved by a flow management thereof, in the situation of FIG. 1.

FIG. 2 schematically and partially shows a structure for implementing a credit-based flow control in the example of FIG. 1. The arbiter ARBTR includes an input queue 10 for each network node N that may write data in the DRAM. In practice, the roles of nodes N are interchangeable, whereby the arbiter includes a queue for each node, so 16 queues in the context of the example.

The queues 10 are designed to contain the words awaiting consumption by the DRAM. These words preferably have the same width as the memory bus, 64 bits here. However, packets arriving from the network are formed of words in accordance with the width of the internal links of the network, 32 bits here. Thus, each queue is preceded by a realignment circuit RALGN, which joins the 32-bit words of the incoming packet to form 64-bit words to be placed in the queue.

Each queue is managed by a control circuit CTRL that counts the available space in the queue and the consumed words for sending credits C to the producer node, through the network. Upon receiving a credit, the producer increments its credit counter and sends new data as long as its counter has not reached zero.

According to conventional techniques, the credit unit is the packet. This implies that the producer and the consumer use the same definition of "packet". However, in the present case, a packet is formed of 32-bit words while the consumer requires 64-bit words. A packet is not seen in the same way on the consumer side than on the producer side.

To overcome this difficulty, the credit unit is first redefined. It is proposed that a credit be indicative of the number of words of width Wc, where Wc is the width of the input queue, in this case the number of 64-bit words directly consumable by the DRAM.

If this definition is integrated directly in conventional calculations, the credit to return would be +1 for each free slot of the queue. On the producer side, a credit of 1 corresponds to 64 bits, thus to a pair of 32-bit words to send.

These two words may not correspond, however, to contiguous locations in the DRAM, so they cannot be written to memory as a single 64-bit word. Even if they have contiguous destinations, the first 32-bit word may have an address that starts at the second half of a 64-bit word in memory. In this case also, the two words cannot be written to memory as a single 64-bit word.

Such "misaligned" words, such as words to be written at random addresses, are written to memory in two consecutive 64-bit words, i.e. in two cycles. For this purpose, the realignment circuit RALGN is designed to analyze the destinations in memory of the incoming 32-bit words, which destinations are contained in the packet header:

if two 32-bit words have contiguous destinations, and the destination of the first word corresponds to an address of a 64-bit memory word, the two words are joined in a single 64-bit slot of the queue;

in the opposite situation, that is to say, if the 32-bit words are misaligned, they are placed in two consecutive 64-bit words of the queue, in the first half or the second half of the respective 64-bit word depending on the destination address in memory. The unused half of the 64-bit word is marked as "invalid" upon writing the word to memory. Indeed, it is possible to invalidate individual bytes upon writing a word to a DRAM, so that the corresponding locations are unaffected by the write operation. This allows writing individual bytes in memory despite a bus size wider than one byte.

As a result two 32-bit may occupy two 64-bit slots in the queue. This corresponds to the worst-case. To account for this, the credit actually used may be divided by 2. This amounts to exposing to the producer a queue that is twice smaller, in terms of number of bits.

Thus, the of credit to use may be expressed by:

$$C=Na/2,$$

where Na is the number of slots available in the queue, in 64-bit words from the consumer side, or pairs of 32-bit words from the producer side.

In general, if the word size on the producer side is Wp, and the word size on the consumer side is Wc, the effective credit may be expressed by:

$$C=Na \cdot Wp/Wc.$$

Given the fact that a network-on-chip has a lean operation mode, i.e. the network bandwidth is matched to ate capacity of the producers and consumers, this calculation mode may be too optimistic, even if it takes into account the worst-case. Indeed, this calculation mode does not take into account the fact that the available space Na in the queue at a time of observation may be filled at any later time by data still in transit or "in flight", which data corresponds to the last credits sent. In a macroscopic network, where the producers and consumers have sufficient hardware resources, this problem is transparent due to the fact that the input queues are sized with sufficient margin. In a network-on-chip, it is desired to make the queues as small as possible.

Thus, it is proposed hereinafter to refine the credit calculation node to account for the data "in flight" The credit may then be expressed by:

$$C=(Na-K \cdot F)/K, \qquad (1)$$

where K=Wc/Wp and F corresponds to the data "in flight". F may be equal to the difference between the cumulated sent credits C and the number of 64-bit words written in the input queue. This value F is produced, for example, by a counter operated by the control circuit CTRL, such that it is incremented by the amount of each sent credit C and decremented each time a (64-bit) slot of the input queue is taken.

It has not yet been specified when a credit is sent. The criteria for sending credits may also be optimized. Indeed, credits should not be suit too frequently, which may cause congestion of the network, or too infrequently, which may cause data production to stall prematurely. A simple criterion is to send a credit each time the memory has consumed a threshold number of words. The threshold may be less than or equal to 1/K=1/2 times the capacity of the input queue. Indeed, with the conventional credit-based techniques, the largest wait interval for sending a credit corresponds to the minimum time required to emptying a full queue, in which case the credit is likely to be equal to the size of the queue. In the present case, since a credit of 1 may result, in the worst-case, in an occupancy of K slots in the queue, the credits are sent K times more frequently, and are at most equal to 1/K times the size of the queue.

In fact, it is preferable to set the threshold to a value slightly less than S/K=S/2, where S is the capacity of the queue, but not too low either, to avoid too much credit traffic. In the considered example, the threshold may be chosen equal to S/2 minus the number of pairs of 32-bit words that can be transmitted during the transit time of a credit.

In the general case, where K is any integer greater than 1, the threshold may be expressed by:

$$Tc=S/K-N_{tc}(K),$$

where $N_{tc}(K)$ is the number of K-tuples of producer words that can be transmitted during, the transit time tc of a credit. The transit time tc may be expressed in clock cycles, and since one producer word is generally transmitted per cycle, $N_{tc}(K)=tc/K$.

The transit time of a credit depending on the number of routers to cross to arrive to destination, an average value may be taken for the transit time.

So far, a factor K corresponding to the worst-case has been involved in the various calculations. There are situations where an adjustable factor Q tending to 1 may be used instead of K. The following figures illustrate this with examples. The credit expression becomes:

$$C=(Na=Q \cdot F)Q=Na/Q-F,$$

where Q is a factor such that 1<Q≤K.

The decision threshold for sending credits becomes Tc=S/Q−tc/Q.

Figure 3:
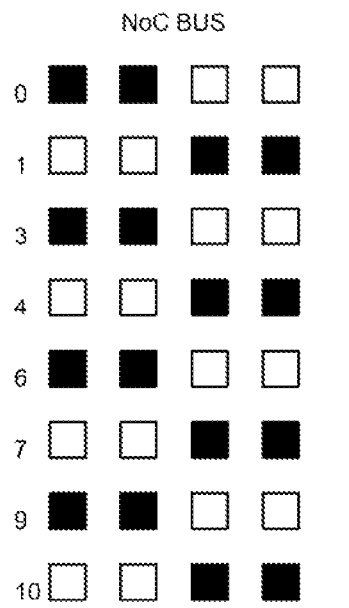
FIG. 3 shows an example of a sequence of words such as products in a network node and as consumed by the external memory.
Figure 3:
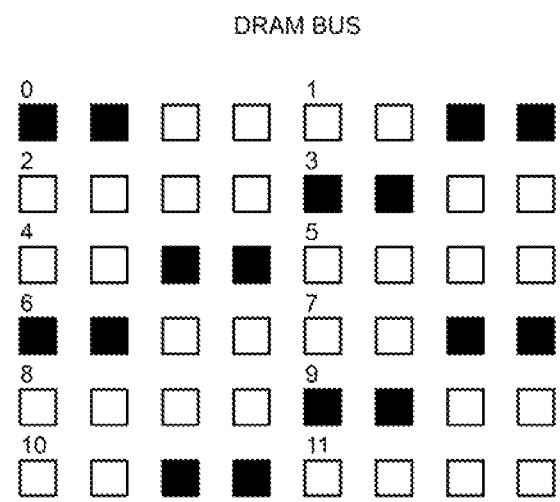

FIG. 3 shows a first example of a succession of words such as produced (on the left) and as consumed by the DRAM, or such as pushed in the input queue (on the right). The producer sends a packet of eight 32-bit words. The process executed by the producer is such that it writes to memory a series of pairs of contiguous bytes (black squares) spaced apart by four bytes (white squares). The four-byte "spaces" are marked as invalid, so that they are not written to memory.

The memory positions, counted in 32-bit words, are shown on the figure. It appears that the producer does not use positions 2, 5 and 8—indeed, they correspond to 32-bit void words, which are not actually sent by the producer.

On the consumer side, the 32-bit words at positions 0 and 1 are joined in a single 64-bit memory word. The following words, at positions 3 and 4 are misaligned. The first is placed at the end of a first 64-bit memory word, and the second is placed at the beginning of a second memory word. The remaining space in these 64-bit words is "stuffing", i.e. invalidated bytes that will not affect the state of the memory. Words at positions 6 and 7 are again aligned and are joined in a single memory word, and so forth . . . .

When the packet of eight 32-bit words has been written to memory, six 64-bit words will have been used. In the worst-case, eight 64-bit words would have been used. In this example Q may be such that Q=3/2.

Figure 4:
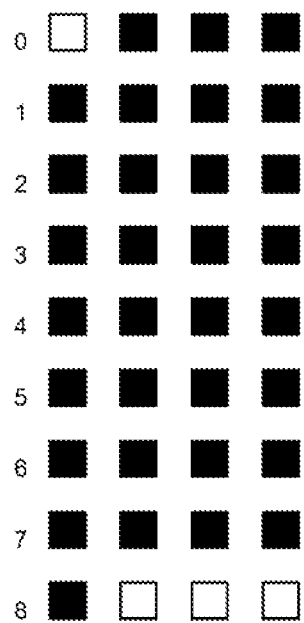
FIG. 4 shows another example of a sequence of words such as products in a network node and as consumed by the external memory.
Figure 4:
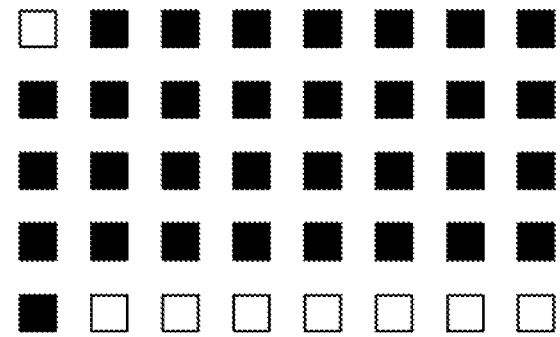

FIG. 4 shows a second example of a sequence of words such as produced (on the left) and as consumed by the DRAM. The producer sends a sequence of 32 contiguous bytes, but the first byte is misaligned. These bytes are transmitted in two successive packets of eight 32-bit words. Only the first word of the second packet in shown at position 8.

When these 32 bytes, transmitted in nine 32-bit words, have been written in memory, five 64-bit words will have been used. In this example, Q may be such that Q=10/9.

In general, if the data sequence is produced with a regular character, the factor Q may be adjusted as a function of the regularity character. For a data burst transmitted in P contiguous Wp-bit words, Q may be chosen such that Q=(P+1)/P. In the first example P=2, and the second P=9.

The burst size P may be known in advance, at least by the data producer process, for example at compile time of the program implementing the process, or by the programmer. This size value P may be transmitted in the packet header to set-up the credit calculation at the packet consumer level.

In practice, it may not be advisable to change the Q factor for each packet, at least to more favorable (decreasing) values, because each factor remains in force during the transit time of the new Q factor, during the beginning of the next packet that may have a less favorable Q factor. Thus, it is preferable to use a constant Q factor, programmed at system initialization, for each queue.

Although a circuit may be dedicated to the calculations involving the variable factor Q, this circuit would implement divisions, requiring relatively complex hardware, and one such circuit would be provided for each queue 10 of the arbiter circuit ARBTR in the considered example. It is preferable to apply an excess value for the Q factor, chosen to be easy to implement. By making Q selectable from 2, 4/3, 8/7 . . . $2^i/(2^i-1)$, the credit is expressed by;

$$C=Na-(Na>>n)-1-F,$$

if the n least significant bits of Na are not all zero, or $$C=Na-(Na>>n)-F,$$

if the n least significant bits are all zero,
where ">>n" denotes as light shift by n bits, and:
n=1 for Q=2,
n=2 for Q=4/3,
n=3 for Q=8/7 . . .
n=i for Q=$2^i/(2^i-1)$, The calculation then boils down to one right-shift and two or three subtractions. In this case, for a burst size of P=2, for which ideally Q=3/2, Q is set equal to 2, whereby n≤1. For a burst size of P=9, for which ideally Q=10/9, Q is set equal to 8/7, whereby n=3. Generally, Q is set such that Q=$2^i(2^i-1)$, where i is an integer chosen such that Q is as close as possible to (P+1)/P by excess.

Both conditional expressions above for the credit are equivalent to the single expression:

$$C=((Na<<n)-Na)>>n-F,$$

A right or left shift by "n" may be performed using a multiplexer that selects the desired word portion to shift, and replaces the missing bits with 0.

It has been considered in the foregoing that the input queue slots were the size of the memory bus (64 bits). It is also conceivable that the slots are adapted to the size of incoming words, of 32 bits. The realignment circuit RALGN would then be placed at the output of the queue, and configured to form 64-bit words to be written to the memory. These 64-bit words could be formed on the go by reading the words in the queue at twice the write speed to memory.

What is claimed is:

1. A credit-based data flow control method between a consumer device and a producer device, the data flow control method matching a bandwidth of a transmission channel between the consumer device and the producer device to a capacity of the consumer device and the producer device, the data flow control method comprising the steps of:
   transmitting Wp-bit words in data packets by the producer device;
   receiving the transmitted data packets in an input queue of the consumer device;
   consuming Wc-bit words from the input queue by the consumer device, where Wc>Wp;
   decrementing a credit counter in the producer device for each transmission of a data packet by the producer device;
   arresting data transmission by the producer device while the credit counter is zero;
   issuing a credit by a controller each time the consumer device has consumed a threshold number of words from the input queue; and
   incrementing the credit counter upon receipt of each credit by the producer device;
   wherein the issued credit, in number of Wc-bit words, is expressed by:

$$C=(Na-Q\cdot F)/Q$$

where: (i) Na is a current available space, in number of Wc-bit words, in the input queue of the consumer device, (ii) Q is a factor such that $1<Q\leq Wc/Wp$, and (iii) F is a current number of in-flight words corresponding to previously issued credits that have not yet arrived in the input queue.

2. The method of claim 1, wherein the consumer device is a memory of Wc-bit words and data is transmitted over a network link in packets of Wp-bits words.

3. The method of claim 2, wherein the factor Q is chosen equal to Wc/Wp when the words of the packets are stored in random locations in the memory.

4. The method of claim 2, wherein the factor Q tends to (P+1)/P, where P is a size of a burst of Wp-bit words stored in contiguous memory locations.

5. The method of claim 1, wherein a credit is issued each time the consumer device has consumed a threshold number of Wc-bit words at most equal to S/Q, where S is a capacity of the queue.

6. The method of claim 5, wherein the threshold number is equal to S/Q minus the number of words that can be transmitted during the transit time of a credit.

7. The method of claim 1, wherein F is determined as the difference between the accumulated issued credits and the number of words received by the consumer device.

8. The method of claim 4, wherein Q=2i/(2i−1), where i is an integer chosen such that Q is as close as possible to (P+1)/P in excess, the credit then being expressed by:

$$C=Na-(Na>>i)-1-F, \text{ if the } i \text{ least significant bits of } Na \text{ are not all zero, or}$$

$$C=Na-(Na>>i)-F, \text{ if the } i \text{ least significant bits are all zero,}$$

where ">>i" denotes a right shift by i bits.

9. The method of claim 4, wherein Q=2i/(2i−1), where i is an integer chosen such that Q is as close as possible to (P+1)/P in excess, the credit then being expressed by:

$$C=((Na<<i)-Na)>>i-F,$$

where ">>i" denotes a right shift by i bits, and "<<i" a left shift by i bits.

10. A credit-based data flow control method between a consumer device and a producer device, the data flow control method matching a bandwidth of a transmission channel between the consumer device and the producer device to a capacity of the consumer device and the producer device, the data flow control method comprising the steps of:
    transmitting words in data packets by the producer device;
    decrementing a credit counter in the producer device for each transmitted data packet by the producer device;
    arresting data packet transmission by the producer device while the credit counter is zero;
    receiving the transmitted data packets in an input queue of the consumer device;
    consuming words from the input queue by the consumer device;
    issuing a credit by a controller each time the consumer device has consumed a threshold number of words from the input queue;
    determining the credit based on a weighted difference between a current available space in the input queue of the consumer device and a current number of in-flight words corresponding to previously issued credits, that have not yet arrived in the input queue;
    and
    incrementing the credit counter upon receipt of each credit by the producer device.

11. The method of claim 10, wherein the step of determining the credit includes weighting the current available queue space by a factor comprised between 1 and a ratio between the respective word sizes of the producer device and the consumer device.

12. The method of claim 10, wherein the current number of in-flight words is determined as the difference between the accumulated issued credits and the number of words received by the consumer device.

13. The method of claim 11, wherein the consumer device is a memory, the method comprising the steps of:
    storing the consumed words in random locations of the memory; and selecting the weighting factor equal to the ratio between the respective word sizes of the producer device and the memory.

14. The method of claim 11, wherein the consumer device is a memory, the method comprising the steps of:
    storing the consumed words in contiguous memory locations; and
    selecting the weighting factor equal to a ratio of the number words stored in the contiguous locations and the number of words plus one.

15. The method of claim 10, wherein the threshold number for issuing a credit is at most equal to the product of the weighting factor by a capacity of the queue.

16. The method of claim 15, wherein the threshold number is equal to the product reduced by the number of words that can be transmitted between the issue of a credit and the reception of the credit by the producer device.

* * * * *